United States Patent
Michaud et al.

(10) Patent No.: US 11,184,179 B2
(45) Date of Patent: Nov. 23, 2021

(54) SECURITY USING SELF-SIGNED CERTIFICATE THAT INCLUDES AN OUT-OF-BAND SHARED SECRET

(71) Applicant: ARRIS Enterprises LLC, Suwanee, GA (US)

(72) Inventors: Ted R. Michaud, Medford, NJ (US); Paul D. Baker, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 240 days.

(21) Appl. No.: 16/266,736

(22) Filed: Feb. 4, 2019

(65) Prior Publication Data

US 2019/0260597 A1    Aug. 22, 2019

Related U.S. Application Data

(60) Provisional application No. 62/626,401, filed on Feb. 5, 2018.

(51) Int. Cl.
*H04L 9/32* (2006.01)
*H04L 9/08* (2006.01)

(52) U.S. Cl.
CPC ............ *H04L 9/3268* (2013.01); *H04L 9/085* (2013.01); *H04L 9/0863* (2013.01); *H04L 9/3242* (2013.01)

(58) Field of Classification Search
CPC ..... H04L 9/3268; H04L 9/085; H04L 9/0863; H04L 9/3242; H04L 63/0823; H04L 9/3249; H04L 9/3252; H04L 9/3255; H04L 9/3257; H04L 9/3247; H04L 9/3263; H04L 9/3265; H04L 2209/64
See application file for complete search history.

(56) References Cited

U.S. PATENT DOCUMENTS

| 7,010,683 | B2* | 3/2006 | Corella | ................. H04L 9/002 713/156 |
| 9,756,505 | B1 | 9/2017 | Jiang et al. | |
| 9,888,037 | B1* | 2/2018 | Sharifi Mehr | ........ H04L 63/205 |
| 2007/0136800 | A1* | 6/2007 | Chan | ................. H04L 63/0869 726/10 |

(Continued)

OTHER PUBLICATIONS

Official Action, RE: Canadian Application No. 3,032,717, dated Jan. 29, 2020.

*Primary Examiner* — Techane Gergiso
(74) *Attorney, Agent, or Firm* — Buchanan Ingersoll & Rooney PC

(57) ABSTRACT

A method is provided for authenticating a first device to a second device using a self-signed digital certificate, when the first device is requested to authenticate itself to the second device. Responsive to the request, a self-signed digital certificate is sent from the first device to the second device. The self-signed digital certificate includes a hash of a password that has been previously provisioned in the first device. The password previously provisioned in the first device is hashed. The hash of the password previously provisioned in the first device is compared, using the second device, with the hash of the password included in the self-signed digital certificate. The first device is authenticated if the second device confirms that the hash of the password previously provisioned in the first device matches the hash of the password included in the self-signed digital certificate.

17 Claims, 4 Drawing Sheets

(56) References Cited

U.S. PATENT DOCUMENTS

| | | | |
|---|---|---|---|
| 2008/0005562 A1* | 1/2008 | Sather | H04L 9/3236 |
| | | | 713/168 |
| 2008/0301438 A1* | 12/2008 | Parkinson | H04L 9/3263 |
| | | | 713/156 |
| 2011/0161661 A1 | 6/2011 | Medvinsky | |
| 2011/0197061 A1 | 8/2011 | Chou | |
| 2011/0246646 A1 | 10/2011 | Nakhjiri | |
| 2013/0145151 A1* | 6/2013 | Brown | H04L 63/0823 |
| | | | 713/156 |
| 2013/0166907 A1* | 6/2013 | Brown | H04L 9/3265 |
| | | | 713/156 |
| 2014/0095873 A1 | 4/2014 | Mulla | |
| 2016/0134621 A1* | 5/2016 | Palanigounder | H04L 63/0823 |
| | | | 713/156 |
| 2019/0116081 A1* | 4/2019 | Gerodolle | H04L 63/08 |
| 2019/0260597 A1* | 8/2019 | Michaud | H04L 9/085 |

* cited by examiner (MAIN) CERTIFICATE DATA ATTRIBUTES —100

SERIAL NUMBER —101
DIGEST ALGORITHM —102
SIGNATURE ALGORITHM—103
SUBJECT NAME—104
ISSUER NAME —105
SUBJECT PUBLIC KEY—106
VALIDITY —107
EXTENSIONS —108
DIGITAL SIGNATURE —109

*FIG. 3*

SECURITY USING SELF-SIGNED CERTIFICATE THAT INCLUDES AN OUT-OF-BAND SHARED SECRET

CLAIM OF PRIORITY TO PROVISIONAL

This application claims benefit of U.S. Provisional Patent Application No. 62/626,401, entitled "IMPROVED SECURITY USING SELF-SIGNED CERTIFICATE THAT INCLUDES AN OUT-OF-BAND SHARED SECRET," filed Feb. 5, 2018, which application is hereby incorporated by reference herein.

BACKGROUND

Establishing trust between electronic devices is important for the security of transactions and for preventing a variety of annoying, malicious, or destructive attacks. One method of establishing trust is public key infrastructure (PKI). Most often, PKI relies on each participant having a private key and a public key for use in cryptographic functions. The public and private keys are used cooperatively for digital signatures and for encrypting/decrypting. Trust between participants is established using digital certificates for each participant, with each digital certificate traceable to a root certificate authority. The root certificate authority takes responsibility for the integrity of each digital certificate in its hierarchy, as long as each participant routinely verifies other digital certificates against a certificate revocation list. There is a cost, often significant, associated with developing and maintaining a root certificate authority and a hierarchy of intermediate and user certificates. In addition, there is a cost associated with routinely verifying participant digital certificates. In some cases, each participant may not have free access to the root certificate authority or its associated certificate revocation list causing the chain of trust to be suspect.

For some applications, the use of a full public key infrastructure is both prudent and cost-effective compared to the risks associated with fraud or other attacks. However, in other cases, the cost associated with a trusted public key infrastructure cannot be justified based on either the quantity of devices involved or the relatively low risk associated with typical transactions between devices. For example, when certificates are employed during a manufacturing process, or when two devices under the control of the same entity need to communicate with one another, a self-signed digital certificate may be employed. In a self-signed certificate, the digital signature field in the certificate is encrypted using the certificate holder's private key for the certificate.

SUMMARY

In accordance with one aspect of the subject matter disclosed herein, a method of authenticating a first device to a second device is provided. In accordance with the method, the first device is requested to authenticate itself to the second device. Responsive to the request, a self-signed digital certificate is sent from the first device to the second device. The self-signed digital certificate includes a hash of a password that has been previously provisioned in the first device. The password previously provisioned in the first device is hashed. The hash of the password previously provisioned in the first device is compared, using the second device, with the hash of the password included in the self-signed digital certificate. The first device is authenticated if the second device confirms that the hash of the password previously provisioned in the first device matches the hash of the password included in the self-signed digital certificate.

In accordance with another aspect of the subject matter disclosed herein, a method for authenticating a server is provided. In accordance with the method, an authentication request is received from a client. Responsive to the authentication request, a self-signed digital certificate is sent from the server to the client. The self-signed digital certificate includes a hash of a password that has been previously provisioned in the client. A communication session is conducted with the client if the client authenticates the server by comparing the hash of the password in the self-signed digital certificate with a previously provisioned password in the client that is provisioned using an out-of-band process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows one example of a format for a digital certificate that complies with the ITU-T Recommendation X.509.

DETAILED DESCRIPTION

Self-signed certificates are one alternative to the high cost and high maintenance associated with full, trusted, public key infrastructure. While a self-signed certificate does not provide security to the user, which for most browsers will prompt a warning message, in some circumstances it may be sufficient. For instance, when accessing a device (e.g., a server) from a client in which both the device and the client belong to or are maintained by the same entity and hence trust one another, a self-signed certificate may be sufficient to ensure the client that that the device is indeed the device with which it is attempting to communicate. That is, when both parties to the communication know each other, a self-signed certificate can be used as a credential to identify a particular entity to itself. In this case there is no need for a third party to act as a root trust. All that is required is that the key pair match—more precisely, that the public key can be used to verify that the certificate was signed with its private key. This case is quite different from other cases in which trust is to be established between unknown parties.

Nevertheless, even in those circumstances where the use of a self-signed certificate is appropriate, it still may be useful to provide a mechanism that allows the client to authenticate the server. In these circumstances an authentication technique such as Basic Authentication over a cryptographic protocol such as Transport Layer Security (TSL)

may be used. However, Basic Authentication transmits usernames and passwords in the clear and thus is not secure. While Digest Authentication never sends the password across the network in the clear, it is not always available or convenient to use.

Accordingly, the techniques described herein allow Basic Authentication to be used when a server or other device needs to be authenticated without transmitting the password in the clear. While these techniques may be employed in many different environments between a wide variety of different devices, one particular example will be presented below for illustrative purposes only and not as a limitation on the applicability of the techniques described herein. In this example the two devices involved are customer premises equipment (CPE) units. CPEs illustratively include, without limitation, devices such as routers, network switches, residential gateways, set-top boxes, home networking adapters and Internet access gateways. In this particular example the CPE being authenticated is a network interface adapter and the device performing the authentication is a network gateway.

Figure 1:
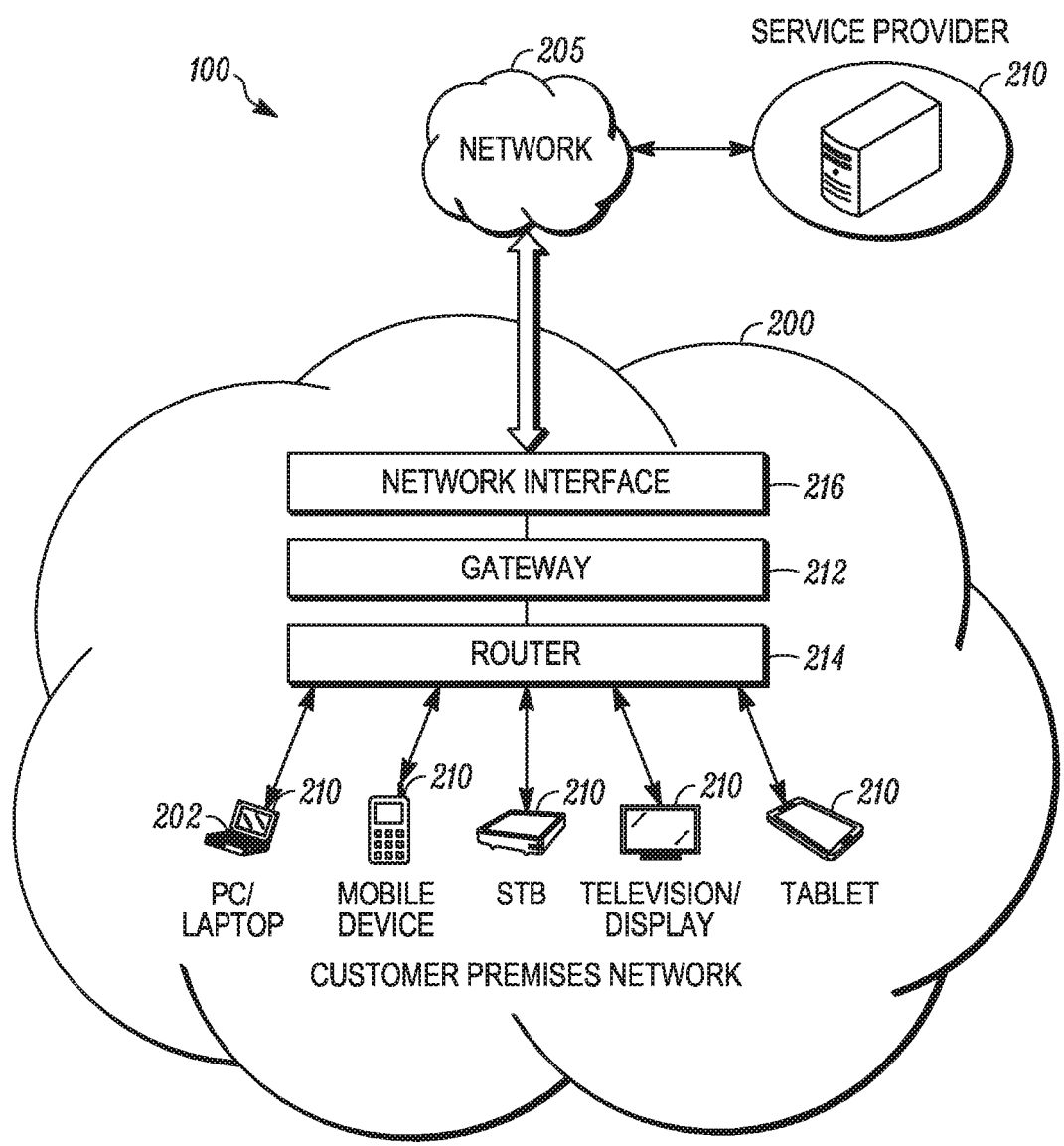
FIG. 1 shows an operating environment in which a customer premises network receives internet access and various services from service providers over a network.

FIG. 1 shows an operating environment in which a customer premises network 200 receives internet access and various services from service providers (e.g., service provider 210) over a network 205. Network 205 may be any type of network whether wired, wireless or any combination thereof. For example, network 205 may be a wide area network (WAN) such as the Internet or an intranet. As another example, network 212 may be a cellular network (e.g., 3G, CDMA). In yet another example, network 205 may be a content delivery system such as a broadcast television network, cable data network (e.g. an all-coaxial or a hybrid-fiber/coax (HFC) network), an xDSL (e.g., ADSL, ADLS2, ADSL2+, VDSL, and VDSL2) system, or a satellite television network. In yet other examples the network 205 may be a combination of two or more different types of networks.

A network interface or adapter 216 is located at the customer premises 200. The network interface 216 is used to establish communication over the network 205. Network interface 216 may be any of a variety of different types of network interfaces depending on the type of network 205 that is employed. For instance, network interface 216 may be a fiber optic network interface, a cable modem or other type of network interface. A customer premises gateway 212 is communicatively coupled to the network interface 216 by one or more communication links using, for example, an Ethernet cable. The customer premises gateway 212 converts the data received from the network interface 216 to a format suitable for distribution to client devices by a router. For instance, the customer premises gateway 212 may convert the data from a link layer protocol such as cable/DOCSIS or DSL to Ethernet.

A router 214 is in turn communicatively coupled to the customer premises gateway 212. The router 214 is capable of wired and/or wireless communication with various devices 210 such as televisions, set top boxes, wireless mobile devices, smartphones, tablets, PDAs, entertainment devices such as video game consoles, consumer electronic devices, PCs, etc. The router 214 establishes a local area network (LAN) with the aforementioned devices. The LAN may operate in accordance with any wired and/or wireless protocol such as Ethernet, Wi-Fi (i.e., IEEE 802.11), Multimedia over Coax (MoCA) and power-line communication technologies.

In the illustrative arrangement shown in FIG. 1, the gateway 212 may function as a client that needs to communicate with the network interface that may function as server. Since the network interface 216 only includes a self-signed certificate, an alternative mechanism needs to be employed if it is desired to have it authenticate itself to the gateway. In accordance with the present disclosure, instead of sending a password in the clear as is used in Basic Authentication, a shared secret (i.e., a password) between the server (e.g., the network interface 216) and the client (e.g., the gateway 212) may be incorporated into the self-signed certificate using a hash function. That is, a hash of the shared secret may be included in the self-signed certificate sent by the server to the client. The client may then apply the same hash operation to the shared secret in its possession to confirm that the hash matches the hash included in the certificate. The shared secret may be pre-provisioned in the client using a suitable out of band process.

Figure 2:
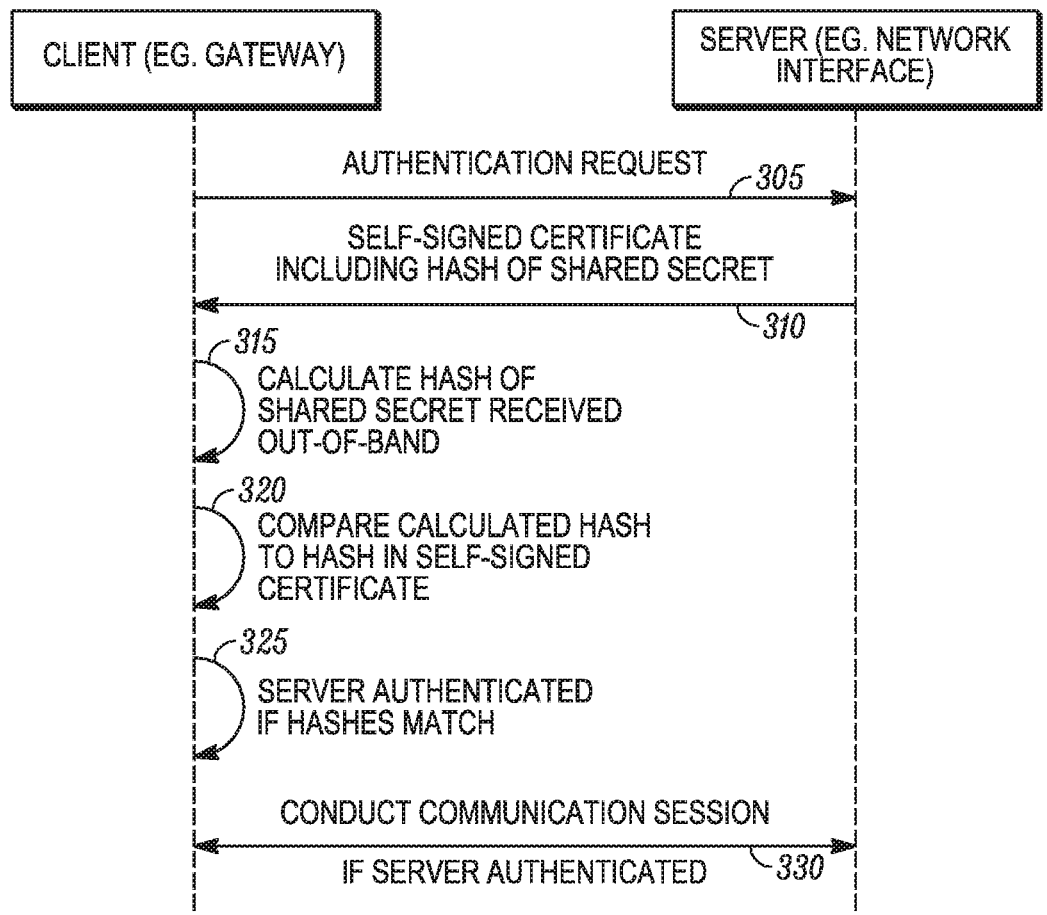
FIG. 2 is a message flow diagram illustrating one example of an authentication process.

The overall authentication process is illustrated in FIG. 2, which is a message flow diagram showing a challenge and response process performed by the client and server. At 305, the client sends an authentication request to the server. The authentication request may be submitted using, for instance, conventional HTTP commands and authorization headers. Next, at 310, the server responds to the challenge by sending the self-signed certificate to the client. The self-signed certificate includes a hash of the shared secret. The hash function may be any suitable function previously agreed upon by both the client and the server. For example, in one embodiment the hash may be SHA-256. The client then authenticates the server by first calculating at 315 the hash (using the previously agreed upon hash function) of the shared secret it previously received by an out of band process. The client then verifies the hash by comparing the hash it just calculated to the hash it received from the server in the self-signed certificate at 320. If the comparison results in a match, the server is authenticated at 325. If the server is authenticated, a communication session between the client and server may proceed at 330.

The hash of the shared secret may be embedded in any suitable part of the self-signed certificate. FIG. 3 shows one example of a format for a digital certificate 100 that complies with the ITU-T Recommendation X.509, as developed by the ISO/IEC/ITU groups. Of course, other certificate formats may be employed as well. The digital certificate 100 includes attributes providing technical information such as a certificate serial number 101. Another attribute, attribute 102, specifies the digest algorithm used in generating the certificate signature. The attribute 103 specifies the signing algorithm (such as RSA or ECC) used in conjunction with the digest algorithm 102 when generating the certificate.

The digital certificate 100 also includes the Subject Name attribute 104, which describes the entity whose public key is being certified, who is sometimes referred to as the Subject. X.509 certificates use distinguished names (DNs) as the standard form of naming. A DN is typically made up of the following components: CN=common name, OU=organizational unit, O=organization, L=locality, ST=state or province, C=country name. The Common Name (CN) of the Subject attribute is normally a required data field.

The digital certificate 100 also includes attribute 105, sometimes referred to as the certificate issuer name, which refers to the Certificate Authority (CA) issuing the digital certificate 100 to a Subject. In the case of a self-signed certificate, the certificate issuer will be the certificate holder whose public key is being certified. The digital certificate 100 also includes the entity's Subject Public Key 106 which is a value generated using an asymmetric cryptographic algorithm (such as RSA or ECC). Included as well is the validity period attribute 107 which is the start and end date during which the certificate is considered valid. The start date in the validity period 107 is generally the date and time that the issuing CA signed the certificate.

In the case of an X.509 certificate, the hash of the shared secret may embedded in the data field of any of the aforementioned attributes. For instance, in one embodiment the hash may be embedded in one of the fields of the distinguished name, such as the data field of the common name, for example. In other embodiments the hash may be embedded in a newly created data field. However, this option may require modifications to a standard certificate format, thereby creating additional complexity.

As previously mentioned, the shared secret may be provided to the client using an out-of-band process. While any suitable process may be employed, if, as in the example of FIG. 1, the client is a CPE unit, then an HTTP device management protocol may be employed, which is generally used to perform such tasks as auto-configuration, software or firmware image management, software module management, status and performance managements, and diagnostics. One example of such a protocol is Technical Report (TR)-069.

Figure 4:
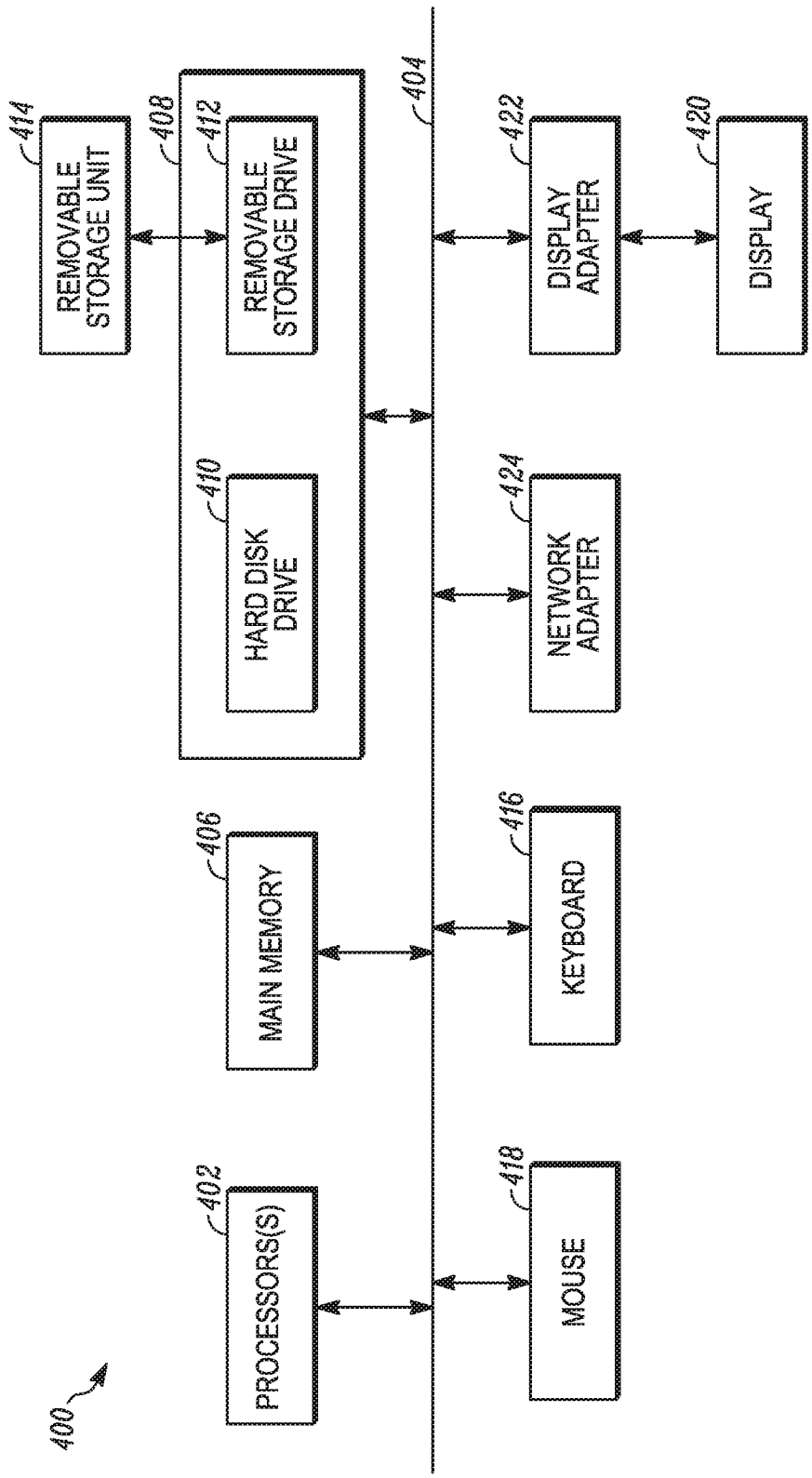
FIG. 4 illustrates a block diagram of one example of a computing apparatus that may be configured to implement or execute one or more of the processes performed by any of the various devices shown herein.

FIG. 4 illustrates a block diagram of one example of a computing apparatus 400 that may be configured to implement or execute one or more of the processes performed by any of the various devices shown herein, including but not limited to the server (e.g., network interface 216 in FIG. 1) and client (e.g., gateway 212) that establish communication with one another. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, where a copy of the program code for one or more of the processes depicted in FIGS. 2-5 may be stored. The removable storage drive 412 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

Although described specifically throughout the entirety of the present disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method of authenticating a first device to a second device, comprising:

receiving, by the second device, a password from the first device via an out-of-band process before transmitting an authentication request to the first device, wherein the first device is a server and the second device is a client;

transmitting, by the second device, the authentication request to the first device, the authentication request requesting the first device to authenticate itself to the second device;

receiving, by the second device, a self-signed digital certificate from the first device, the self-signed digital certificate including a hash of the password shared between the first device and the second device;

hashing, by the second device, the password received via the out-of-band process by the second device;

comparing, by the second device, the hash of the password received via the out-of-band process in the second device, with the hash of the password included in the self-signed digital certificate;

authenticating the first device if the second device confirms that the hash of the password received via the out-of-band process in the second device matches the hash of the password included in the self-signed digital certificate; and establishing, by the second computing device, a communication session with the first computing device.

2. The method of claim 1, wherein the first and second devices are customer premises equipment (CPE) units.

3. The method of claim 2, wherein the CPE units are selected from the group consisting of routers, network switches, residential gateways, set-top boxes, home networking adapters and Internet access gateways.

4. The method of claim 1, wherein the out-of-band process is an HTTP-device management protocol.

5. The method of claim 4, wherein the HTTP-device management protocol is TR-069.

6. The method of claim 1, wherein the authentication request is transmitted using an HTTP-based protocol.

7. The method of claim 1, wherein the hash of the password is embedded in a data field of a pre-defined attribute included in the self-signed digital certificate.

8. The method of claim 7, wherein the pre-defined attribute is a distinguished name.

9. The method of claim 8, wherein the distinguished name attribute includes a common name field and the hash of the password is embedded in the common name field.

10. The method of claim 1, wherein the hash is SHA-256.

11. A computer-readable medium having computer executable instructions for implementing a method comprising:
- storing a password at a second device, the password received from a first device via an out-of-band process before establishing communication between the first and second device, wherein the first device is a server and the second device is a client;
- establishing communication with a first device that is to be authenticated by the second device;
- receiving from the first device a self-signed digital certificate, the self-signed digital certificate including a hash of the password;
- authenticating the first device if the hash of the password in the self-signed digital certificate matches a hash of the password stored in the second device; and
- establishing, by the second computing device, a communication session with the first computing device.

12. The computer-readable medium of claim 11, wherein the first and second devices are customer premises equipment (CPE) units.

13. The computer-readable medium of claim 11, wherein the hash of the password is embedded in a data field of a pre-defined attribute included in the self-signed digital certificate.

14. The computer-readable medium of claim 13, wherein the pre-defined attribute isa distinguished name.

15. A method for authenticating a server, comprising:
- receiving an authentication request from a client;
- responsive to the authentication request, sending a self-signed digital certificate from the server to the client, the self-signed digital certificate including a hash of a password that has been previously provisioned in the client via an out-of-band process before receiving an authentication request from the client; and
- conducting a communication session with the client if the client authenticates the server by comparing the hash of the password in the self-signed digital certificate with a previously provisioned password in the client that is provisioned using an out-of-band process.

16. The method of claim 15, wherein the hash of the password is embedded in a data field of a pre-defined attribute included in the self-signed digital certificate.

17. The method of claim 15, wherein the pre-defined attribute is a distinguished name.

* * * * *